W. R. SMITH.
SPRING CONSTRUCTION.
APPLICATION FILED SEPT. 3, 1908.
935,701.
Patented Oct. 5, 1909.
3 SHEETS—SHEET 1.
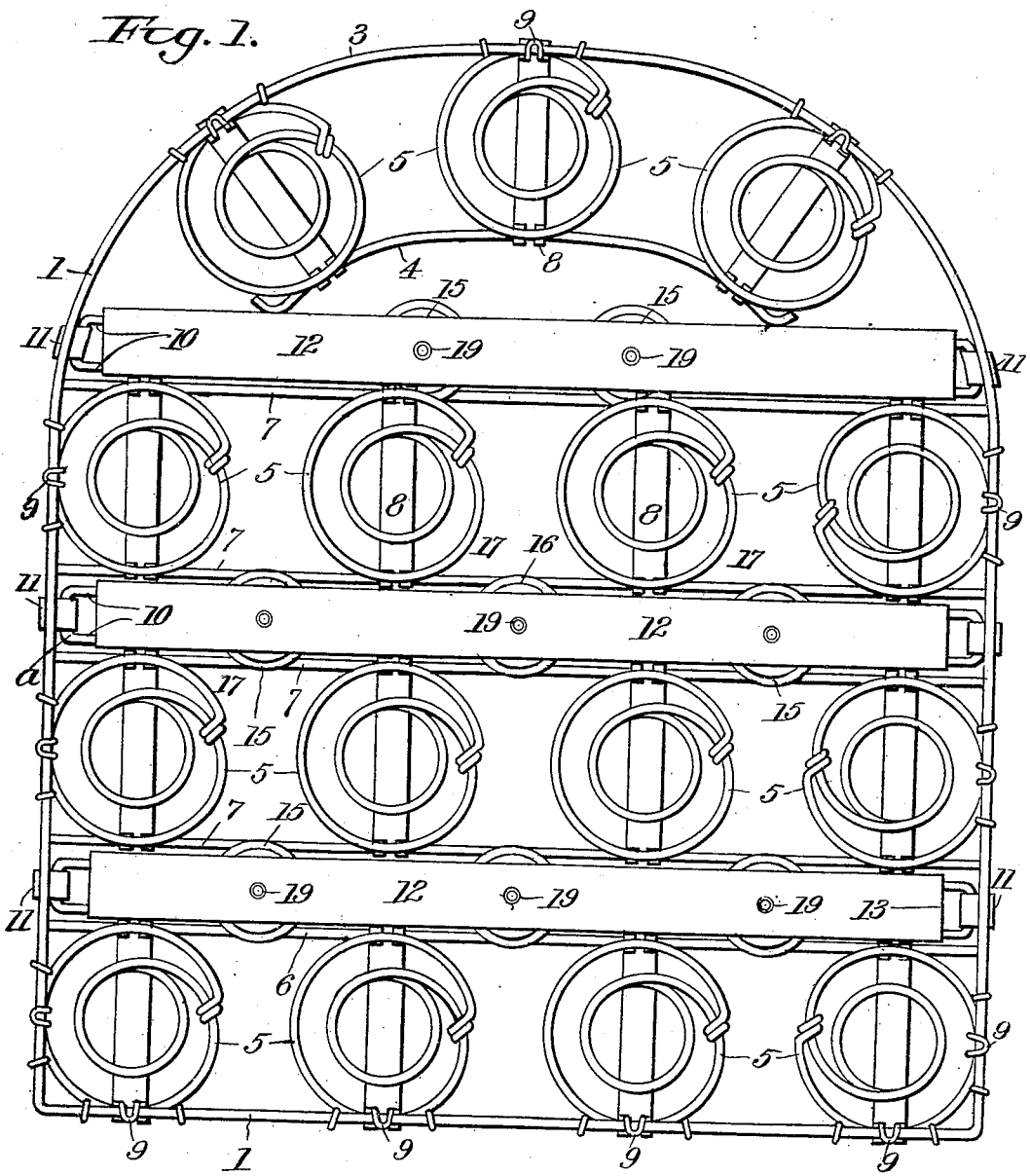
Witnesses
C. H. Walker
J. T. Walker
Inventor
Watson R. Smith
By
Attorney

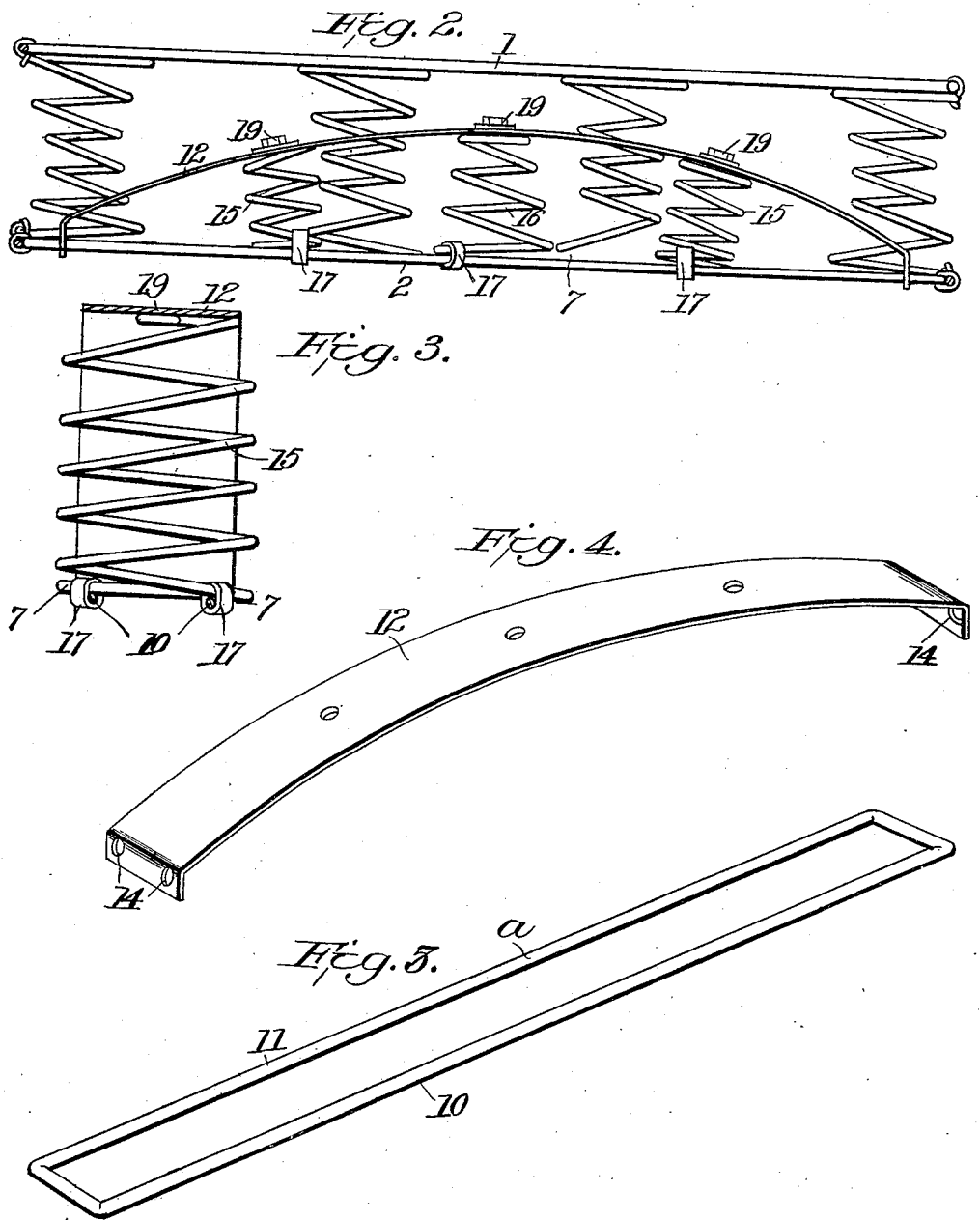

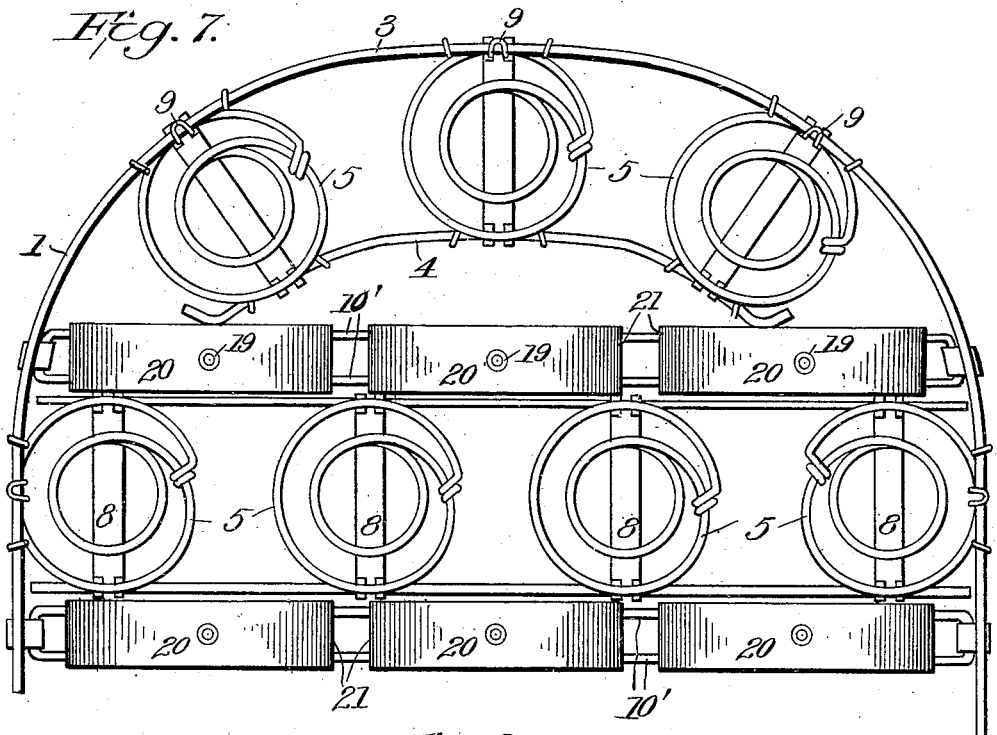
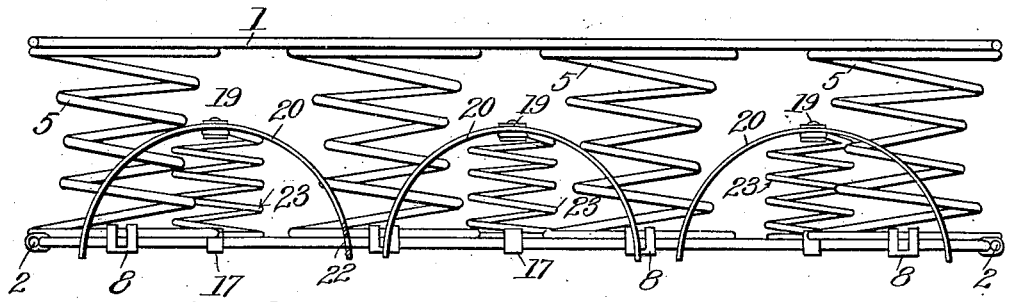
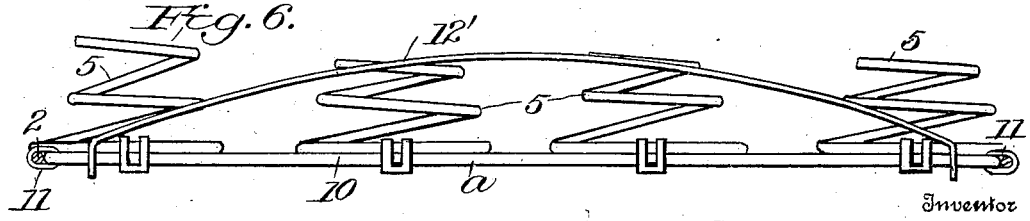

UNITED STATES PATENT OFFICE.

WATSON R. SMITH, OF JACKSON, MICHIGAN, ASSIGNOR TO JACKSON CUSHION SPRING COMPANY, OF JACKSON, MICHIGAN.

SPRING CONSTRUCTION.

935,701.      Specification of Letters Patent.      Patented Oct. 5, 1909.

Application filed September 3, 1908. Serial No. 451,574.

*To all whom it may concern:*

Be it known that I, WATSON R. SMITH, a citizen of the United States, residing at Jackson, in the county of Jackson and State of Michigan, have invented certain new and useful Improvements in Spring Constructions, of which the following is a specification.

This invention relates to spring constructions.

One object is to provide a spring construction for automobile or other seats embodying such characteristics that the rider of the structure will not be injured or inconvenienced by reason of contact with the support upon which the structure is mounted in the event that the seat should be jarred incident to the weight of a heavy rider or in the event of the vehicle contacting with an obstruction in the roadway.

Another object is to reinforce the main springs of the structure with one or more single or compound auxiliary springs adapted to be compressed when the structure is subjected to unusual weight, whereby the auxiliary springs will catch the extra weight and prevent the structure from being wholly compressed.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a top plan view of one form of the invention. Fig. 2 is a transverse sectional view. Fig. 3 is a sectional view on the line *a—a* of Fig. 1. Fig. 4 is a detail perspective view of one of the auxiliary arch springs. Fig. 5 is a detail plan view of one of the auxiliary arch spring supports. Fig. 6 is a transverse sectional view of a second form of the invention. Fig. 7 is a top plan view of a third form of the invention. Fig. 8 is a transverse sectional view of the third form of the invention.

Referring now to the accompanying drawings, and more particularly to Figs. 1 to 3 inclusive, the reference characters 1 and 2 indicate upper and lower edge wires of the frame which may be rectangular in formation or which may have one end curved, as at 3. If the cushion is formed round at one end, as shown, there will be a curved supporting wire 4 adapted to coöperate with the curved lower edge wire 2 for the support of the forward main springs 5. Coöperating with the rear end of the structure is a main spring supporting wire 6, upon which and the rear end of the lower edge wire are mounted the rear main springs 5, there being pairs of supporting wires 7 arranged between the aforesaid supporting wires 4 and 6 for the support of other main springs 5. The supporting wires may be disposed within the frame formed by the upper and lower edge wires in any suitable manner, and the main springs may be secured in place at their lower ends by means of suitable clips 8, and at their upper ends along the border of the upper edge wire by means of suitable clips 9. However, the clips employed in connection with the springs are not claimed in this case, and it will be understood that they may be of any particular variety. Between certain of the main spring supporting wires 4, 6 and 7 are arranged auxiliary supporting elements *a* including spaced parallel members 10, and these auxiliary supports may be secured to opposite sides of the lower edge wire by means of any suitable type of clips 11. Slidably mounted upon each auxiliary support *a* is an elongated flat spring metal element forming arch springs 12, each arch spring 12 having its opposite ends directed downwardly, as indicated at 13, and provided with a pair of openings 14 adapted to embrace the parallel members 12 of the respective auxiliary support wire, whereby the arch springs may slide upon the auxiliary support wires when the structure is subjected to heavy weight. The arch springs have their intermediate or highest points terminating short of the upper convolutions of the main springs so that if the main springs are subjected to a light pressure, the auxiliary arch springs will not be compressed at all, but only when the main springs are practically completely compressed, thereby preventing the heavy weight of the rider from passing below the lower edge wire. When these auxiliary arch springs are compressed their ends slide outwardly away from each other on the auxiliary support wires, and their bodies moved toward the auxiliary support wires. To prevent the auxiliary arch springs from being compressed to the extent of meeting relation with the auxiliary support wires, and thereby cushion them, I dispose beneath each arch spring a plurality of coiled springs, which may all be of the type indicated at 15, or the intermediate one of three or more may be conical, as indicated at 16 (see Fig. 2), the lower convolution of the conical spring 16, if used, extending over both the corresponding main and auxiliary supporting wires and connected to the lower convolutions of the four adjacent main springs 5 by means of suitable clips 17. The other springs 15 may project beyond the sides of the parallel members 10 of the auxiliary supporting wires and be connected to the main spring supporting wires by means of suitable clips 18. In any event, regardless of the character of springs which coöperate with the arch springs, they are preferably connected by means of suitable rivets or the like 19 to the arch springs. Thus when the structure is subjected to unusual weight, the auxiliary springs 12 are compressed and caused to slide at their ends upon the auxiliary supporting wires, and when the structure is relieved of pressure, the other set of coöperating auxiliary springs 15—16 serve to cause the auxiliary springs 12 to assume their normal position within the frame. Thus the auxiliary spring metal arched strips 12 are reinforced by a second set of auxiliary springs 15—16, and it will be understood that only one spring may be employed beneath each arch spring 12, if desired.

In Fig. 6, I illustrate a spring construction embodying exactly the same characteristics as the construction hereinbefore described, except that the auxiliary arch springs 12′ are not reinforced by another auxiliary set of springs beneath them, but on the other hand these arch springs 12′ being made of spring metal, have their slidable movement upon their supporting wires in the same manner as the other arch springs described, and they will assume their normal positions when the structure is relieved of unusual weight, even though the second set of auxiliary springs are not employed.

In Figs. 7 and 8 I illustrate still another form of the invention in which the main springs are mounted in the structure in exactly the same way as the structures hereinbefore referred to, but instead of employing the elongated arch springs 12 and 12′, I mount upon the parallel members 10′ of the auxiliary spring support wires a′ a series of alining short arched springs 20, which have their ends directed downwardly, as indicated at 21, and at each end provided with a pair of openings 22 adapted to embrace and slide upon the corresponding parallel members 10′ of the auxiliary spring supporting wires in exactly the same manner as described in connection with the ends of the elongated arch springs 12 and 12′. In this third form of invention, I preferably secure beneath each short arch spring 20 a spring 23 which is connected to each of the arch springs 20 intermediate the ends of the latter and secure at opposite sides upon the parallel members 10′ of the auxiliary arch spring supporting wires a′, as shown.

It will be seen that in the use of either one of the three forms of invention described, that the auxiliary arch springs will catch the extra weights and prevent the structure from being wholly compressed. It will also be seen that these auxiliary arch springs will not be acted upon and compressed until the main springs have been at least partially compressed. It will also be seen that while I may employ one or more auxiliary coiled springs in connection with each arch spring to return the latter normally to its initial position when the structure is relieved of pressure, that, as shown in Fig. 6; these second auxiliary springs are not absolutely essential, although I desire to protect and claim the same in this particular application.

What is claimed is:—

1. A spring construction comprising a frame, main and auxiliary spring supporting wires mounted in the frame, main springs mounted upon the main spring supporting wires, and elongated flat spring metal arch springs extending almost across the construction and slidably mounted upon said auxiliary spring supporting wires.

2. A spring construction comprising a frame, main and auxiliary spring supporting wires mounted in the frame, main springs mounted upon the main spring supporting wires, elongated flat spring metal arch springs extending almost across the construction and slidably mounted upon said auxiliary spring supporting wires, and a plurality of auxiliary coiled springs mounted beneath the elongated arched auxiliary springs.

3. A spring construction comprising a frame, main and auxiliary spring supporting wires mounted in the frame, main springs mounted upon the main spring supporting wires, elongated flat spring metal arch springs extending almost across the construction and slidably mounted upon said auxiliary spring supporting wires, and a spring mounted beneath each elongated arched auxiliary spring.

4. A spring construction comprising a frame, main springs mounted within the frame, auxiliary arch springs mounted within the frame between rows of main springs, and a coiled spring mounted beneath each arch spring.

5. A spring construction comprising a frame, main springs mounted within the frame, auxiliary arch springs mounted within the frame between rows of main springs, and a plurality of springs beneath each auxiliary arch spring.

6. A spring construction comprising a frame, main springs mounted within the frame, auxiliary springs slidably mounted at each end in the frame between rows of main springs to catch the extra weight and subject to compression subsequent to the compression of the main springs, the auxiliary springs each extending nearly across the structure.

7. A spring construction comprising a frame, main springs mounted within the frame, auxiliary springs slidably mounted in the frame between the main springs and subject to compression subsequent to the compression of the main springs, and a spring mounted beneath each of the auxiliary springs.

8. A spring construction comprising a frame, main springs mounted within the frame, auxiliary springs slidably mounted in the frame, between the main spring, and subject to compression subsequent to the compression of the main springs, and a plurality of springs mounted beneath each of the auxiliary springs.

9. A spring construction comprising a frame, main springs mounted within the frame, auxiliary spring supporting wires in the frame, and an elongated arch spring provided with openings to embrace each of the auxiliary spring supporting wires whereby the arch springs may slide thereupon when compressed and when relieved of pressure.

10. A spring construction comprising a frame, main springs mounted within the frame, auxiliary spring supporting wires in the frame, an elongated arch spring provided with openings to embrace each of the auxiliary spring supporting wires whereby the arch springs may slide thereupon when compressed and when relieved of pressure, and yieldable means under each arch spring to cushion the latter and return them to their normal positions when the structure is relieved of pressure.

11. In a spring construction, a frame, main springs in the frame, auxiliary arch springs in the frame between rows of main springs to catch the extra weight, and a spring mounted beneath each arch spring.

12. In a spring construction, a frame, main springs mounted in the frame, an auxiliary arch spring mounted in the frame between rows of main springs to catch the extra weight, and yieldable means mounted beneath the arch springs for coöperation with the latter to cushion it and aid in catching the extra weight.

13. In a spring construction, a frame, main springs in the frame, and an auxiliary arch spring mounted in the frame between the main springs to catch the extra weight and having its opposite ends slidably mounted.

14. In a spring construction, a frame, main springs in the frame, an auxiliary arch spring mounted in the frame and having its highest point terminating short of the upper convolutions of the main springs, and a yieldable means beneath the arch springs to cushion the latter.

15. In a spring construction, a frame, main springs in the frame, an auxiliary spring supporting means in the frame, an auxiliary spring slidably embracing said means, and a yieldable means to cushion the auxiliary spring.

16. In a spring construction, a frame, main springs in the frame, an auxiliary arch spring in the frame extending nearly across the structure, and means for supporting the auxiliary spring, the auxiliary spring having slidable connection at each end with its supporting means.

17. In a spring construction, a frame, main springs in the frame, an auxiliary arch spring in the frame, and means for supporting the auxiliary spring, the auxiliary spring having slidable connection at each end with its supporting means.

18. In a spring construction, a frame, main springs in the frame, an auxiliary arch spring in the frame extending nearly across the structure, means for supporting the auxiliary spring, the auxiliary spring having slidable connection at each end with its supporting means, and a yieldable means beneath the auxiliary spring to cushion the same.

19. In a spring construction, a frame, main springs in the frame, an auxiliary arch spring in the frame, means for supporting the auxiliary spring, the auxiliary spring having slidable connection at each end with its supporting means, and a yieldable means beneath the auxiliary spring to cushion the same.

20. In a spring construction, a frame, main springs in the frame, an auxiliary arch spring mounted in the frame between adjacent rows of main springs and having its opposite ends slidably mounted, and a cushioning means beneath the arch spring.

21. In a spring construction, a frame, main springs in the frame, a substantially semi-elliptical shaped arch spring in the frame between adjacent rows of main springs to catch the extra weight, and a cushioning means beneath the auxiliary spring.

22. In a spring construction, a frame, main springs in the frame, an auxiliary arch spring mounted in the frame and having its opposite ends slidably mounted, and a cushioning means beneath the arch spring.

23. In a spring construction, a frame, main springs in the frame, and a substantially semi-elliptical shaped auxiliary arch spring in the frame extending nearly across the latter between rows of main springs to catch the extra weight.

24. In a spring construction, a frame, main springs in the frame, a substantially semi-elliptical shaped auxiliary arch spring in the frame extending nearly across the latter to catch the extra weight, and a spring beneath said auxiliary spring and disposed intermediate the ends of the latter.

25. In a spring construction, a frame, main springs in the frame, and a substantially semi-elliptical shaped auxiliary arch spring disposed between adjacent rows of main springs and extending nearly across the frame and having its ends slidably mounted in the frame.

In testimony whereof I affix my signature, in presence of two witnesses.

WATSON R. SMITH.

Witnesses:
 ETHEL M. PHELAN,
 GRACE E. PERKINS.